US010360006B2

(12) United States Patent
Eguchi

(10) Patent No.: US 10,360,006 B2
(45) Date of Patent: Jul. 23, 2019

(54) SOURCE CODE GENERATION DEVICE, SOURCE CODE GENERATION METHOD, AND RECORDING MEDIUM

(71) Applicant: NEC Corporation, Minato-ku, Tokyo (JP)

(72) Inventor: Jun Eguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 319 days.

(21) Appl. No.: 15/122,216

(22) PCT Filed: Feb. 26, 2015

(86) PCT No.: PCT/JP2015/000996
§ 371 (c)(1),
(2) Date: Aug. 29, 2016

(87) PCT Pub. No.: WO2015/141150
PCT Pub. Date: Sep. 24, 2015

(65) Prior Publication Data
US 2016/0364221 A1 Dec. 15, 2016

(30) Foreign Application Priority Data

Mar. 19, 2014 (JP) ................. 2014-056686

(51) Int. Cl.
*G06F 8/20* (2018.01)
*G06F 8/30* (2018.01)
*G06F 8/51* (2018.01)

(52) U.S. Cl.
CPC .............. *G06F 8/51* (2013.01); *G06F 8/22* (2013.01); *G06F 8/30* (2013.01)

(58) Field of Classification Search
CPC ................................ G06F 8/51; G06F 8/22
See application file for complete search history.

(56) References Cited

U.S. PATENT DOCUMENTS 5,507,030 A * 4/1996 Sites ................... G06F 8/30
712/E9.028
7,240,338 B1 * 7/2007 Bell .................... G06F 8/51
717/137

(Continued)

FOREIGN PATENT DOCUMENTS

JP 2008-305376 A 12/2008
JP 2010-140408 A 6/2010

OTHER PUBLICATIONS

Zineb El Akkaoui et al., "A model-driven framework for ETL process development," 2011 [retrieved on Mar. 1, 2019], Proceedings of the ACM 14th international workshop on Data Warehousing and OLAP, pp. 45-52, downloaded from the Internet at <url>:ttps://dl.acm.org. (Year: 2011).*

(Continued)

*Primary Examiner* — Thuy Dao
*Assistant Examiner* — Stephen D Berman

(57) ABSTRACT

A source code described in a programming language for an ETL tool is generated from a source code described in a procedural programming language. A source code acquisition unit acquires a source code described in a procedural programming language and in which a group of instructions that handles one or more variables is described. A processing block generation unit generates a group of processing blocks associated with the group of instructions described in the source code acquired. A port setting unit sets, in a group of processing blocks associated with a group of instructions executed between execution of an instruction that handles first a variable focused on and execution of an instruction that handles last the variable focused on, among the group of processing blocks generated, an input port and an output port for transmitting data referred to by the variable focused (Continued)

on. A port connection unit connects the input port and the output port set.

5 Claims, 9 Drawing Sheets

(56) References Cited

U.S. PATENT DOCUMENTS

| | | | | |
|---|---|---|---|---|
| 7,761,406 | B2* | 7/2010 | Harken | G06F 17/303 |
| | | | | 707/602 |
| 8,099,725 | B2* | 1/2012 | Jin | G06F 17/30421 |
| | | | | 717/106 |
| 8,331,694 | B2 | 12/2012 | Ogawara | |
| 8,930,881 | B1* | 1/2015 | Eddins | G06F 8/22 |
| | | | | 717/100 |
| 9,043,764 | B2* | 5/2015 | Ranganathan | G06F 17/30563 |
| | | | | 717/106 |
| 9,361,137 | B2* | 6/2016 | Behnen | G06F 9/44505 |
| 2003/0110468 | A1* | 6/2003 | Maki | G06F 8/30 |
| | | | | 717/106 |
| 2005/0243604 | A1* | 11/2005 | Harken | G06F 8/51 |
| | | | | 365/185.22 |
| 2007/0261038 | A1* | 11/2007 | Suba | G06F 8/51 |
| | | | | 717/136 |
| 2008/0147703 | A1* | 6/2008 | Behnen | G06F 9/44505 |
| 2008/0244541 | A1* | 10/2008 | Thomson | G06F 8/31 |
| | | | | 717/143 |
| 2008/0320054 | A1* | 12/2008 | Howard | G06F 8/51 |
| 2009/0136123 | A1 | 5/2009 | Ogawara | |
| 2010/0131933 | A1* | 5/2010 | Kim | G06F 8/447 |
| | | | | 717/137 |
| 2010/0280990 | A1 | 11/2010 | Castellanos et al. | |
| 2014/0282368 | A1* | 9/2014 | Howard | G06F 8/20 |
| | | | | 717/105 |

OTHER PUBLICATIONS

Marco Trudel et al., "Automatic C to O-O Translation with C2Eiffel," 2012 [retrieved on Mar. 1, 2019], 19th Working Conference on Reverse Engineering, pp. 501-502, downloaded from the Internet at <url>:https://ieeexplore.ieee.org. (Year: 2012).*

Thomas Jorg et al., "Towards generating ETL processes for incremental loading," 2008 [retrieved on Mar. 1, 2019], Proceedings of the 2008 international symposium on Database engineering & applications, pp. 101-110, downloaded from the Internet at <url>:ttps://dl.acm.org. (Year: 2008).*

International Search Report for PCT Application No. PCT/JP2015/000996, dated Apr. 21, 2015.

* cited by examiner

Fig. 3

```
000100 IDENTIFICATION DIVISION.
000200 PROGRAM-ID.     ZCOB01.
000300 ENVIRONMENT DIVISION.
000400 INPUT-OUTPUT SECTION.
000500 FILE-CONTROL.
000600 SELECT I-FILE
000700     ASSIGN TO "test.in"
000800     ORGANIZATION LINE SEQUENTIAL.
000900 SELECT O-FILE
001000     ASSIGN TO "test.out"
001100     ORGANIZATION LINE SEQUENTIAL.
001200 DATA DIVISION.
001300 FILE SECTION.
001400 FD  I-FILE
001500     LABEL RECORDS ARE STANDARD.
001600 01  INP-REC.
001700     03 REC-NUMBER PIC 9(6) VALUE 0.
001750     03 FILLER PIC X(1018).
001800 FD  O-FILE
001900     LABEL RECORDS ARE STANDARD.
002000 01  OUT-REC.
002100     03 REC-NUMBER PIC 9(6) VALUE 0.
002150     03 FILLER PIC X(1018).
002200 WORKING-STORAGE SECTION.
002300 77  W-INPUT-FILENAME PIC X(256) VALUE "test.in".
002400 77  W-OUTPUT-FILENAME PIC X(256) VALUE "test.out".
002600 77  W-EOF PIC X VALUE LOW-VALUE.
002800 77  W-ADD   PIC 9(6) VALUE 100.
002900 01  WORK-REC.
003000     03 NUMBERING PIC 9(6) VALUE 0.
003100     03 FILLER PIC X(1018).
003300 PROCEDURE DIVISION.
003400 OPEN INPUT I-FILE.
003500 OPEN OUTPUT O-FILE.
003600 READ I-FILE INTO INP-REC AT END MOVE HIGH-VALUE TO W-EOF.
003700 PERFORM UNTIL W-EOF = HIGH-VALUE
003800    MOVE INP-REC TO WORK-REC
003900    ADD W-ADD TO NUMBERING OF WORK-REC
004100    WRITE OUT-REC FROM WORK-REC
004200    READ I-FILE INTO INP-REC
004300        AT END MOVE HIGH-VALUE TO W-EOF END-READ
004400 END-PERFORM.
004500 CLOSE I-FILE.
004600 CLOSE O-FILE.
004700 STOP RUN.
```

Fig. 4

PROCESSING BLOCK GENERATION INFORMATION

| INSTRUCTION (COBOL) | PROCESSING BLOCK (PowerCenter) |
|---|---|
| Input | Source |
| Read | Source Qualifier |
| MOVE | Expression |
| ADD | Expression |
| Write | Target |
| ⋮ | ⋮ |

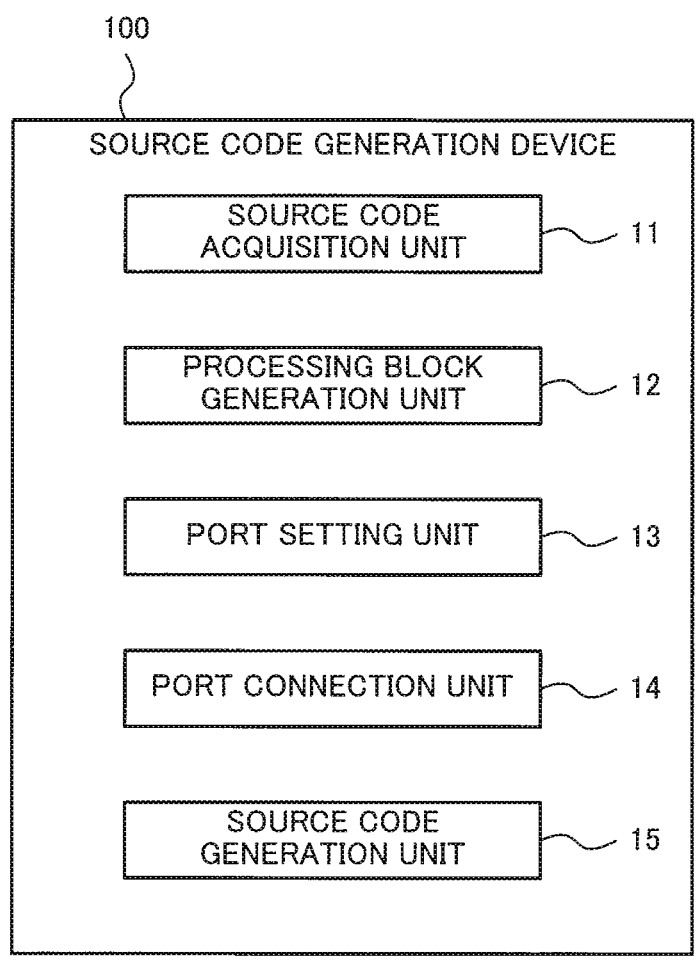

SOURCE CODE GENERATION DEVICE, SOURCE CODE GENERATION METHOD, AND RECORDING MEDIUM

This application is a National Stage Entry of PCT/JP2015/000996 filed on Feb. 26, 2015, which claims priority from Japanese Patent Application 2014-056686 filed on Mar. 19, 2014, the contents of all of which are incorporated herein by reference, in their entirety.

TECHNICAL FIELD

The present invention relates to a source code generation device, a source code generation method, and a recording medium.

BACKGROUND ART

In general, programming languages and development tools employed for system development are replaced, with the advance of time. For example, when a new programming language that provides higher development efficiency than an existing programming language is developed, the new programming language is thereafter employed for the system development. From the viewpoint of ease of maintenance of a system, however, it is not desirable that a module developed on the basis of a different programming language is mixed in the system.

Accordingly, for example when a new module developed on the basis of a new programming language is to be added to an existing module, it is desirable to reconstruct the existing module with the new programming language. Therefore, a new technique is required for generating a source code described in the new programming language on the basis of the source code described in the existing programming language. For example, PTL 1 discloses a source code converter for converting a source code described in a first programming language into a source code described in a second programming language.

CITATION LIST

Patent Literature

[PTL1] Japanese Patent Application Laid-Open Publication No. 2010-140408

SUMMARY OF INVENTION

Technical Problem

In the field of data processing system, reconstruction of a module developed with a procedural programming language with a programming language for an ETL (Extract Transform Load) tool is currently promoted. However, the source code converter disclosed in PTL1 is designed for converting a source code described in a procedural programming language into a source code described in another procedural programming language. Therefore, the source code converter disclosed in PTL1 is unable to generate a source code described in the programming language for the ETL tool from the source code described in the procedural programming language. For such reason, it is desirable to develop a technique for generating a source code described in the programming language for the ETL tool, from the source code described in the procedural programming language.

The present invention has been accomplished in view of the foregoing problems, and an object of the present invention is to provide a source code generation device, a source code generation method, and a recording medium suitable for generating a source code described in the programming language for the ETL tool, from the source code described in the procedural programming language.

Solution to Problem

In order to achieve the above object, a source code generation device according to an exemplary aspect of the invention includes: a source code acquisition means for acquiring a source code described in a procedural programming language and in which a group of instructions that handles one or more variables is described; a processing block generation means for generating a group of processing blocks associated with the group of instructions described in the source code acquired by the source code acquisition means; a port setting means for setting, in a group of processing blocks associated with a group of instructions executed between execution of an instruction that handles first a variable focused on among the one or more variables and execution of an instruction that handles last the variable focused on, among the group of processing blocks generated by the processing block generation means, an input port and an output port for transmitting data referred to by the variable focused on; a port connection means for connecting the input port and the output port set by the port setting means in such a way that the data referred to by the variable focused on is transmitted; and a source code generation means for generating a source code described in a programming language for an ETL tool by executing, with respect to all of the one or more variables, the processing to be executed by the port setting means and the port connection means with respect to the variable focused on.

In order to achieve the above object, a source code generation method according to an exemplary aspect of the invention includes: acquiring a source code described in a procedural programming language and in which a group of instructions that handles one or more variables is described; generating a group of processing blocks associated with the group of instructions described in the source code acquired; setting, in a group of processing blocks associated with a group of instructions executed between execution of an instruction that handles first a variable focused on among the one or more variables and execution of an instruction that handles last the variable focused on, among the group of processing blocks generated, an input port and an output port for transmitting data referred to by the variable focused on; connecting the input port and the output port set in such a way that the data referred to by the variable focused on is transmitted; and generating a source code described in a programming language for an ETL tool by executing, with respect to all of the one or more variables, the setting an input port and an output port and the connecting the input port and the output port with respect to the variable focused on.

In order to achieve the above object, a computer readable storage medium according to an exemplary aspect of the invention records thereon a program, causing a computer to function as: a source code acquisition means for acquiring a source code described in a procedural programming language and in which a group of instructions that handles one or more variables is described; a processing block generation means for generating a group of processing blocks associated with the group of instructions described in the source code acquired by the source code acquisition means; a port setting means for setting, in a group of processing blocks associated with a group of instructions executed between execution of an instruction that handles first a variable focused on among the one or more variables and execution of an instruction that handles last the variable focused on, among the group of processing blocks generated by the processing block generation means, an input port and an output port for transmitting data referred to by the variable focused on; a port connection means for connecting the input port and the output port set by the port setting means in such a way that the data referred to by the variable focused on is transmitted; and a source code generation means for generating a source code described in a programming language for an ETL tool by executing, with respect to all of the one or more variables, the processing to be executed by the port setting means and the port connection means with respect to the variable focused on.

Advantageous Effects of Invention

The present invention enables a source code described in a programming language for an ETL tool to be generated from a source code described in a procedural programming language.

BRIEF DESCRIPTION OF DRAWINGS

FIG. 3 is a diagram illustrating an example of a source code described in a procedural programming language;

FIG. 4 is a table showing processing block generation information;

FIG. 9 is a block diagram showing a characteristic configuration of the exemplary embodiment of the present invention.

DESCRIPTION OF EMBODIMENTS

Hereafter, an exemplary embodiment of the present invention will be described with reference to the drawings.

Exemplary Embodiment

First, a configuration of a source code generation device 100 according to the exemplary embodiment of the present invention will be described. The source code generation device 100 is configured to generate, from a source code in which a process is described in a procedural programming language, a source code in which the same process is described in a programming language for an ETL (Extract Transform Load) tool. In other words, the source code generation device 100 may also be construed as a device for converting a source code described in the procedural programming language into a source code described in the programming language for the ETL tool.

The procedural programming language is a programming language according to a program paradigm based on the concept of procedure call. Examples of the procedural programming language include COBOL (Common Business Oriented Language), C language, BASIC (Beginner's All-purpose Symbolic Instruction Code), and FORTRAN (Formula Translation). In the source code described in the procedural programming language, basically a group of instructions are described according to execution sequence. The group of instructions include instructions to execute a process using a variable. In this exemplary embodiment, the procedural programming language will be exemplified by COBOL, and the source code will be exemplified by a program representing a data conversion process.

The ETL tool is a tool (software) for supporting extraction of data accumulated in an enterprise system, processing of the data into a format that facilitates the use in a data warehouse, and writing of the processed data in a target database. Examples of the ETL tool include PowerCenter (Registered Trademark) distributed by Informatica (Registered Trademark), DataStage (Registered Trademark) distributed by IBM (Registered Trademark), ODI (Oracle Data Integrator) distributed by Oracle (Registered Trademark), and BODI (Business Objects Data Integrator) distributed by SAP (Registered Trademark). The programming language for the ETL tool is primarily used for describing a data conversion process. The source code described in the programming language for the ETL tool represents a program in which a group of processing blocks are described in a mutually associated manner. In this exemplary embodiment, the ETL tool will be exemplified by PowerCenter.

Figure 1:
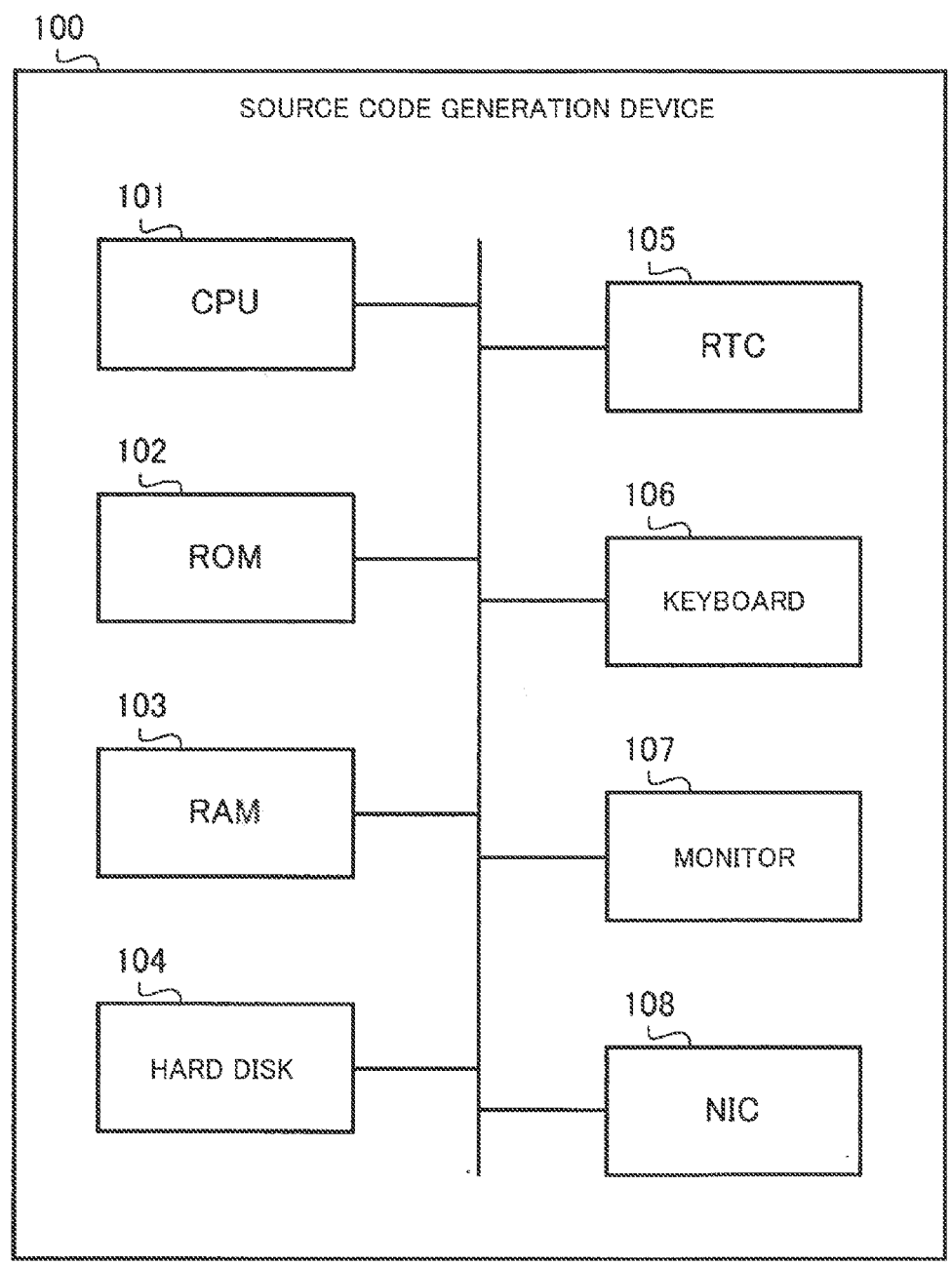
FIG. 1 is a configuration diagram of a source code generation device according to an exemplary embodiment of the present invention.

As shown in FIG. 1, the source code generation device 100 includes, as physical structure, a CPU (Central Processing Unit) 101, a ROM (Read-Only Memory) 102, a RAM (Random Access Memory) 103, a hard disk 104, a RTC (Real Time Clock) 105, a keyboard 106, a monitor 107, and a NIC (Network Interface Card) 108. Each of the mentioned constituent elements are connected via a bus provided in the source code generation device 100. The source code generation device 100 may be, for example, implemented on a personal computer.

The CPU 101 controls the overall operation of the source code generation device 100 according to a program stored in the hard disk 104. The CPU 101 is connected to each of the constituent elements via the bus, to transmit and receive control signals and data.

The ROM 102 stores an IPL (initial program loader) executed immediately after power is turned on. After the IPL is executed, the CPU 101 reads out the program stored in the hard disk 104 onto the RAM 103, to execute the program.

The RAM 103 temporarily stores data and programs. The RAM 103 also temporarily stores the program read out from the hard disk 104 and data necessary for the processing and the like.

The hard disk 104 stores the programs to be executed by the CPU 101. The hard disk 104 also stores a source code described in COBOL and a source code for PowerCenter generated through a source code generation process to be subsequently described. In addition, the hard disk 104 stores processing block generation information to be subsequently described, and other kinds of information necessary for the processing. The information stored in the hard disk 104 may be stored therein in advance, or may be acquired from an external device through the NIC 108 as needed.

The RTC 105 is a time-keeping device including a crystal oscillator or an oscillation circuit. The RTC 105 receives power from a built-in battery, so continue to work even while the power supply to the source code generation device 100 is off.

The keyboard 106 receives various inputs from the operator of the source code generation device 100 and the like. The source code generation device 100 may be provided with a mouse, instead of or in addition to the keyboard 106.

The monitor 107 displays various types of screens under the control of the CPU 101. The monitor 107 is constituted of, for example, a LCD (liquid crystal display) or a CRT (cathode ray tube).

The NIC 108 transmits and receives various types of information to and from an external device through the communication network, under the control of the CPU 101.

Figure 2:
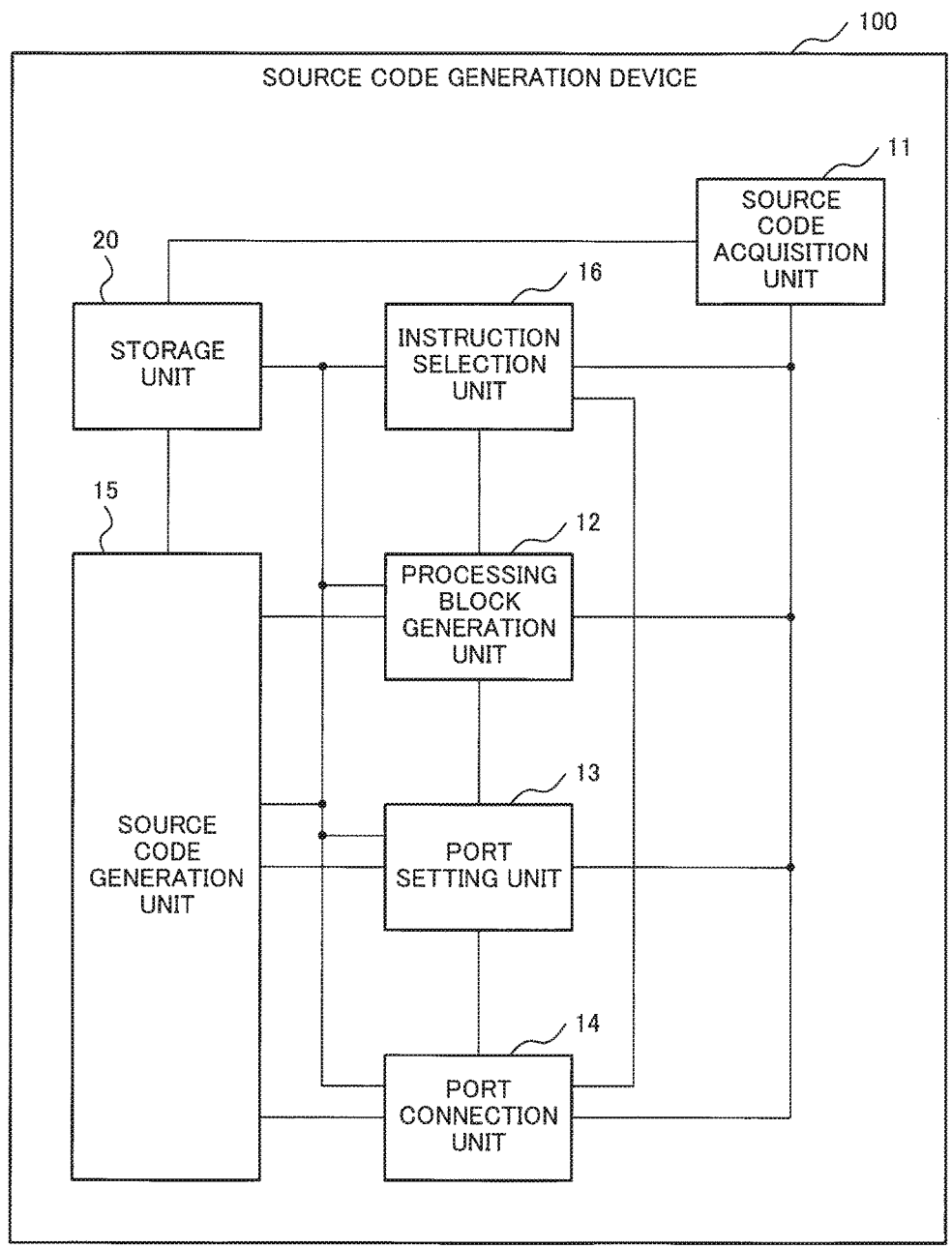
FIG. 2 is a block diagram for explaining functions of the source code generation device according to the exemplary embodiment.

Hereunder, functions of the source code generation device 100 will be described. As shown in FIG. 2, the source code generation device 100 includes, from the viewpoint of functions, a source code acquisition unit 11, a processing block generation unit 12, a port setting unit 13, a port connection unit 14, a source code generation unit 15, an instruction selection unit 16, and a storage unit 20.

The source code acquisition unit 11 acquires a source code described in the procedural programming language and in which a group of instructions handles one or more variables is described. Basically, the group of instructions are described in the execution sequence. The source code acquisition unit 11 acquires, for example, the source code stored in the hard disk 104 or an external device. The source code acquisition unit 11 includes, for example, the CPU 101.

The processing block generation unit 12 generates a group of processing blocks associated with the group of instructions described in the source code acquired by the source code acquisition unit 11. The processing block generation unit 12 generates the processing block associated with the instruction described in the source code, for example on the basis of the processing block generation information stored in the hard disk 104. The processing block generation unit 12 includes, for example, the CPU 101.

The port setting unit 13 sets an input port and an output port for transmitting data referred to by a variable focused on, in a specific group of processing blocks. The specific group of processing blocks refers to a group of processing blocks associated with a specific group of instructions among the group of processing blocks generated by the processing block generation unit 12. The specific group of instructions refers to a group of instructions executed between execution of an instruction that handles first the variable focused on and execution of an instruction that handles last the variable focused on. The variable focused on refers to one of the one or more variables described above. However, as will be subsequently described, all of the one or more variables described above are finally selected as variable focused on. The port setting unit 13 includes, for example, the CPU 101.

The port connection unit 14 connects the input port and the output port set by the port setting unit 13 thereby allowing the transmission of the data referred to by the variable focused on. The port connection unit 14 includes, for example, the CPU 101.

The source code generation unit 15 generates a source code described in the programming language for the ETL tool. The source code is acquired by executing, with respect to all of the one or more variables described above, the processing to be executed by the port setting unit 13 and the port connection unit 14 with respect to the variable focused on. The source code generation unit 15 includes, for example, the CPU 101.

The instruction selection unit 16 selects an instruction focused on according to the execution sequence of the group of instructions, among the group of instructions described in the source code acquired by the source code acquisition unit 11. The instruction selection unit 16 selects, for example, instructions described in the source code from the top, as an instruction focused on. The instruction selection unit 16 includes, for example, the CPU 101.

Here, the processing block generation unit 12 generates a processing block focused on associated with the instruction focused on. To be more detailed, the processing block generation unit 12 generates the processing block focused on associated with the selected instruction focused on, each time the instruction selection unit 16 selects the instruction focused on.

The port setting unit 13 then regards the variable handled by the instruction focused on as being the variable focused on when the instruction focused on handles one of the one or more variables described above, and sets an unset input port and an unset output port, among the input ports and output ports for transmitting the variable focused on, in the specific group of processing blocks. The specific group of processing blocks refers to the group of processing blocks between the processing block associated with the instruction that handles first the variable focused on, and the processing block focused on.

Thus, the port setting unit 13 sets, each time the processing block generation unit 12 generates the processing block, the input port and the output port for transmitting, to the generated processing block, the data referred to by the variable handled by the generated processing block. Here, the processing block for which the input port and the output port are set is naturally the processing block that has been generated. Accordingly, when the variable is further handled in a processing block of a succeeding stage, the input port and the output port for transmitting the data referred to by the mentioned variable to the processing block of the succeeding stage are further set, at the time that the processing block of the succeeding stage is generated.

Then the port connection unit 14 connects the input port and the output port newly set by the port setting unit 13, to thereby allow the data referred to by the variable focused on to be transmitted among the group of processing blocks between the processing block associated with the instruction that handles first the variable focused on, and the processing block focused on.

The instruction selection unit 16 then selects the next instruction according to the execution sequence of the group of instructions, after the processing block generation unit 12, the port setting unit 13, and the port connection unit 14 have completed the processing with respect to the instruction focused on.

Now, upon deciding that the instruction focused on is a part of a group of instructions related to a loop processing, the processing block generation unit 12 generates a processing block associated with the instruction focused on, on the basis of the content of another group of instructions related to the loop processing. Here, when the source code contains the loop processing, the processing block may not be properly generated through generating one by one the processing block associated with the instruction related to the loop processing. For example, the group of instructions related to the loop processing may include an instruction, for which duplicated processing blocks are generated upon generating a processing block associated with that instruction. For such reason, it is preferable that the processing block associated with the instruction focused on is generated on the basis of the content of another group of instructions related to the loop processing, when the source code contains the loop processing.

As described above, when the source code contains the loop processing, it is desirable to generate the group of processing blocks related to the loop processing, on the assumption that the group of instructions related to the loop processing constitute one set. The time point for detecting the presence of the loop processing may be adjusted as needed. Preferably, the presence of the loop processing may be detected, for example, at the time of generating a structural model or generating a sequential model. To detect the presence of the loop processing, for example, it may be decided, when an instruction that is likely to be the instruction at the head of the loop processing is detected, whether an instruction corresponding to the detected instruction is present in subsequent instructions. When it is decided that the corresponding instruction is present, the group of instructions between the detected instruction and the corresponding instruction is handled as the group of instructions related to the loop processing.

The storage unit 20 stores therein the source code acquired by the source code acquisition unit 11 and the source code generated by the source code generation unit 15. The storage unit 20 also stores various types of information to be referenced by the processing block generation unit 12, the port setting unit 13, the port connection unit 14, the source code generation unit 15, and the instruction selection unit 16. For example, the storage unit 20 stores a source code described in COBOL or a source code for an ETL tool. In addition, the storage unit 20 stores, for example, the processing block generation information to be referenced by the processing block generation unit 12. The storage unit 20 includes, for example, the hard disk 104.

Referring now to FIG. 3, the source code described in the procedural programming language (COBOL) will be described.

As shown in FIG. 3, in the source code of COBOL, a group of instructions are described according to the execution sequence. In the source code of COBOL, statements other than the instruction statements, such as various declaration statements and definition statements, are described. For example, 000600 to 000800 are statements defining an input file. 000900 to 001100 are statements defining an output file. 001400 to 001750 are statements defining an input buffer. 001800 to 002150 are statements defining an output buffer. 002800 is a statement defining an operation variable. 002900 to 003100 are statements defining an operation buffer.

Further, 003400 to 003500 are instruction statements instructing to open a file. 003600 is an instruction statement instructing to input data. 003800 is a first instruction statement instructing to edit data. 003900 is a second instruction statement instructing to edit data. 004100 is an instruction statement instructing to output data. 004200 to 004300 are instruction statements instructing to input data. 004500 to 004600 are instruction statements instructing to close a file.

The group of instructions enclosed by broken lines (003600 to 004400) are handled as a group of instructions related to a loop processing. The instruction statement "READ I-FILE INTO INP-REC AT END MOVE HIGH-VALUE TO W-EOF." described in 003600 is likely to be an instruction statement at the head of the loop processing.

When such an instruction statement as described in 003600 is detected, a search is performed for an instruction statement that corresponds to the instruction statement described in 003600 and that should normally be located at the head of the loop processing, though located at the end of the loop processing in COBOL.

For example, when the loop processing is reading from and writing in a file, (a) the file to be read from (I-FILE), (b) the variable of the destination of the read data (INP-REC), and (c) the process to be executed upon reaching the end of the file (AT END MOVE HIGH-VALUE TO W-EOF) are the same, between the instruction statement at the head of the loop processing and the instruction statement corresponding to the instruction statement at the head of the loop processing. Therefore, the instruction statement "READ I-FILE INTO INP-REC AT END MOVE HIGH-VALUE TO W-EOF END-READ" described in 004200 to 004300, in which all of the file to be read from, the variable of the destination of the read data, and the process to be executed upon reaching the end of the file are the same as those of the instruction statement described in 003600, is detected as the instruction statement corresponding to the instruction statement at the head of the loop processing.

The instruction statement described in 003600 and the instruction statement described in 004200 to 004300 are handled as a set. When a loop structure is not present in the ETL tool, the instruction statements related to the loop control are omitted, and hence the processing block associated with such instruction statements is not generated. This is because a similar processing to the loop processing is executed by the ETL tool, despite the loop structure not being present. In other words, with the ETL tool, a given processing block processes the supplied data each time the data is supplied from the processing block of the preceding stage, and provides the processed data to the processing block of the succeeding stage.

The source code shown in FIG. 3 represents repetitions of the processes (1) to (5) specified below, with respect to all the data from the head of I-FILE to the end of I-FILE. The processes are: (1) reading out the data from I-FILE (input file) onto INP-REC (variable); (2) copying the read out data from INP-REC to WORK-REC (variable); (3) adding a constant (100) to the copied data using WORK-REC; (4) copying the data after adding from WORK-REC to OUT-REC (variable); and (5) writing the data after adding in O-FILE (output file) associated with OUT-REC.

Referring now to FIG. 4, the processing block generation information will be described. The processing block generation information associates an instruction of COBOL with a processing block of PowerCenter. Therefore, the processing block generation unit 12 can identify the processing block of PowerCenter associated with the instruction of COBOL, by referencing the processing block generation information.

In the example shown in FIG. 4, the instructions of Input, Read, MOVE, ADD, and Write in COBOL are respectively associated with the processing blocks of Source, Source Qualifier (SQ, transformation), Expression (transformation), Expression (transformation), and Target in PowerCenter. The transformation may also be called filter.

Figure 5:
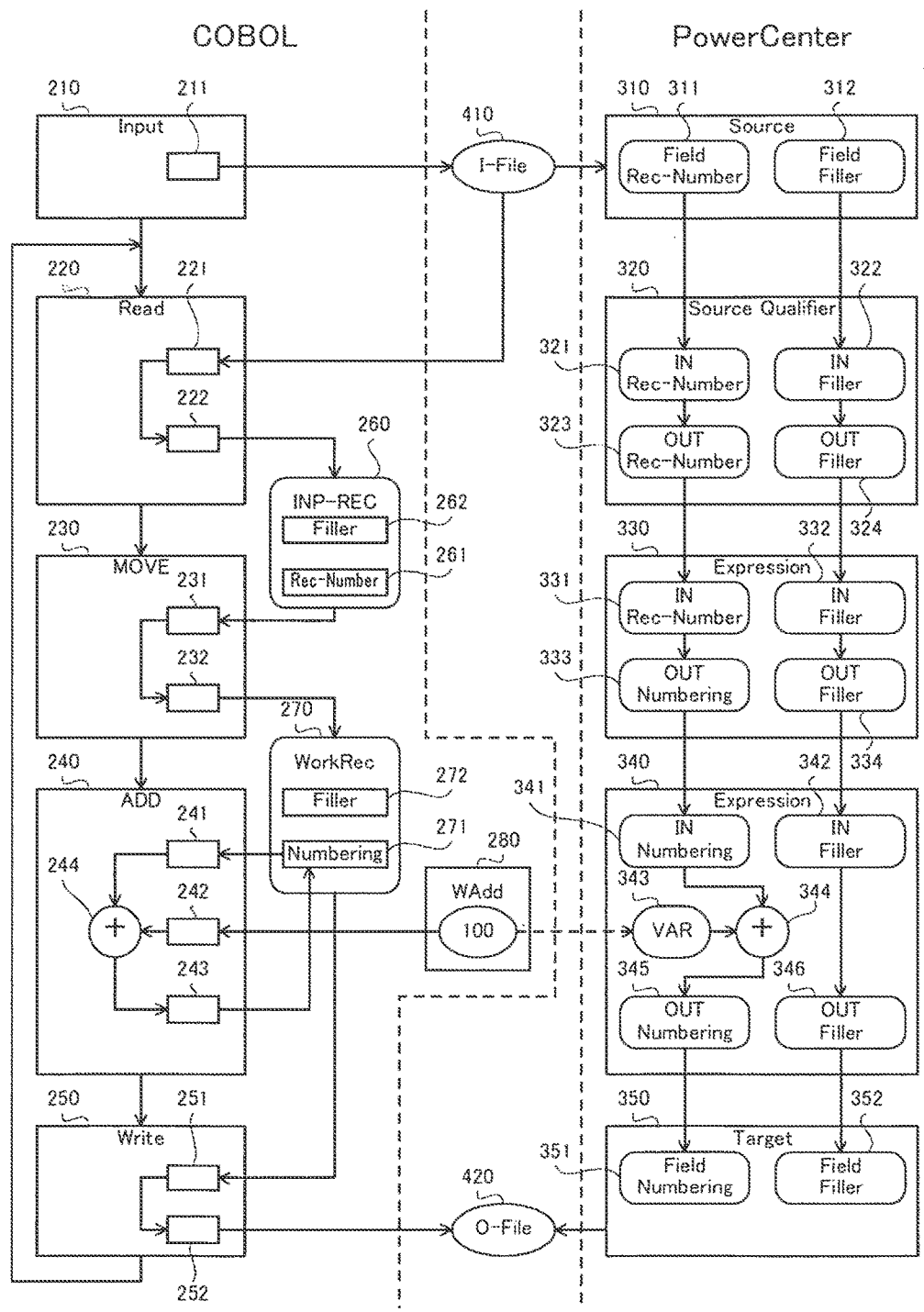
FIG. 5 is a block diagram showing correspondence relationships between a group of instructions and a group of processing blocks.

Referring to FIG. 5, the correspondence relationships between the source code described in COBOL and the source code for PowerCenter will be described. FIG. 5 illustrates the relationship between the group of instructions from 003400 to 004600 shown in FIG. 3 and the group of processing blocks associated with the group of instructions. In FIG. 5, the definition statement of O-File and the description related to OUT-REC which is the variable for writing in O-File and the like are omitted. First, the group of instructions included in the source code described in COBOL will be described.

An instruction 210 is an instruction of a type "Input", described in 003400 of the source file. With the instruction 210, a register 211 and a file 410 are associated with each other, to allow the file 410 to be referred to. When execution of the instruction 210 is completed, execution of an instruction 220 is started. Here, the file 410 is an input file named I-File.

The instruction 220 is an instruction of a type "Read", described in 003600 (or 004200 to 004300) of the source file. With the instruction 220, the data in the file 410 is retrieved into the register 221, and the data retrieved into the register 221 is stored in a register 222. The data stored in the register 222 is stored in a variable 260. Here, the variable 260 is a structure variable named INP-REC, including a variable 261 named Rec-Number and a variable 262 named Filler. When execution of the instruction 220 is completed, execution of an instruction 230 is started.

The instruction 230 is an instruction of a type "MOVE", described in 003800 of the source file. With the instruction 230, the data stored in the variable 260 is retrieved into a register 231, and the data retrieved into the register 231 is stored in a register 232. The data stored in the register 232 is stored in a variable 270. Here, the variable 270 is a structure variable named WorkRec, including a variable 271 named Numbering and a variable 272 named Filler. When execution of the instruction 230 is completed, execution of an instruction 240 is started.

The instruction 240 is an instruction of a type "ADD", described in 003900 of the source file. With the instruction 240, the data stored in the variable 271 is retrieved into a register 241, and the data stored in a constant storage unit 280 is retrieved into a register 242. Here, the constant storage unit 280 is referred to by a name WAdd, and stores the constant (100). The data retrieved into the register 241 and the data retrieved into the register 242 are added by an adder 244, and the data obtained by adding is stored in a register 243. The data stored in the register 243 is stored in the variable 271. When execution of the instruction 240 is completed, execution of an instruction 250 is started.

The instruction 250 is an instruction of a type "Write", described in 004100 of the source file. With the instruction 250, the data stored in the variable 270 is retrieved into a register 251, and the data retrieved into the register 251 is stored a register 252. The data stored in the register 252 is written in a file 420. The file 420 is an output file named O-File. When execution of the instruction 250 is completed, execution of the instruction 220 is started, unless a condition to finish the loop is satisfied.

Hereunder, the group of processing blocks included in the source code for PowerCenter to be generated (mapping in PowerCenter) will be described.

A processing block 310 is a processing block of a type "Source" associated with the instruction 210. The processing block 310 includes a field 311 and a field 312. After being associated with the file 410, the processing block 310 stores the data read out from the file 410 in the field 311 and the field 312. The field 311 is associated with a variable named Rec-Number. The field 312 is associated with a variable named Filler. The field is basically the same as the input port or the output port, except that the field is used for connection to a file.

The processing block 320 is a processing block of a type "Source Qualifier" associated with the instruction 220. The processing block 320 includes an input port 321, an input port 322, an output port 323, and an output port 324. The input port 321 is connected to the field 311, and stores data supplied from the field 311. The input port 321 is associated with a variable named Rec-Number. The input port 322 is connected to the field 312 and stores data supplied from the field 312. The input port 322 is associated with a variable named Filler. The output port 323 is connected to the input port 321 and stores data supplied from the input port 321. The output port 323 is associated with a variable named Rec-Number. The output port 324 is connected to the input port 322 and stores data supplied from the input port 322. The output port 324 is associated with a variable named Filler.

The processing block 330 is a processing block of a type "Expression" associated with the instruction 230. The processing block 330 includes an input port 331, an input port 332, an output port 333, and an output port 334. The input port 331 is connected to the output port 323 and stores data supplied from the output port 323. The input port 331 is associated with a variable named Rec-Number. The input port 332 is connected to the output port 324 and stores data supplied from the output port 324. The input port 332 is associated with a variable named Filler. The output port 333 is connected to the input port 331 and stores data supplied from the input port 331. The output port 333 is associated with a variable named Numbering. The output port 334 is connected to the input port 332 and stores data supplied from the input port 332. The output port 334 is associated with a variable named Filler.

The processing block 340 is a processing block of a type "Expression" associated with the instruction 240. The processing block 340 includes an input port 341, an input port 342, a constant storage unit 343, an adder 344, an output port 345, and an output port 346. The input port 341 is connected to the output port 333 and stores data supplied from the output port 333. The input port 341 is associated with a variable named Numbering. The input port 342 is connected to the output port 334 and stores data supplied from the output port 334. The input port 342 is associated with a variable named Filler.

The constant storage unit 343 stores the data (100) stored in the constant storage unit 280. The adder 344 adds the data supplied from the input port 341 and the data supplied from the constant storage unit 343, and supplies the data obtained by adding to the output port 345. The output port 345 is connected to the adder 344, and stores the data supplied from the adder 344. The output port 345 is associated with a variable named Numbering. The output port 346 is connected to the input port 342, and stores the data supplied from the input port 342. The output port 346 is associated with a variable named Filler.

The processing block 350 is a processing block of a type "Target" associated with the instruction 250. The processing block 350 includes a field 351 and a field 352. The field 351 is connected to the output port 345, and stores data supplied from the output port 345. The field 351 is associated with a variable named Numbering. The field 352 is connected to the output port 346, and stores data supplied from the output port 346. The field 352 is associated with a variable named Filler. After being associated with the file 420, the processing block 350 writes the data stored in the field 351 and the field 352, in the file 420.

As described above, the instruction on the source code of COBOL is substituted with the processing block on the source code of PowerCenter. The variable on the source code of COBOL is substituted with the port provided for the processing block on the source code of PowerCenter. Further, the loop structure (from the instruction 220 to the instruction 250) on the source code of COBOL is omitted on the source code of PowerCenter. However, each of the processing blocks on the source code of PowerCenter processes the supplied data each time the data is supplied from the processing block of the preceding stage to the input port, and supplies the processed data to the processing block of the succeeding stage through the output port. Therefore, the same control as that for the loop structure in COBOL is also performed in PowerCenter.

Figure 6:
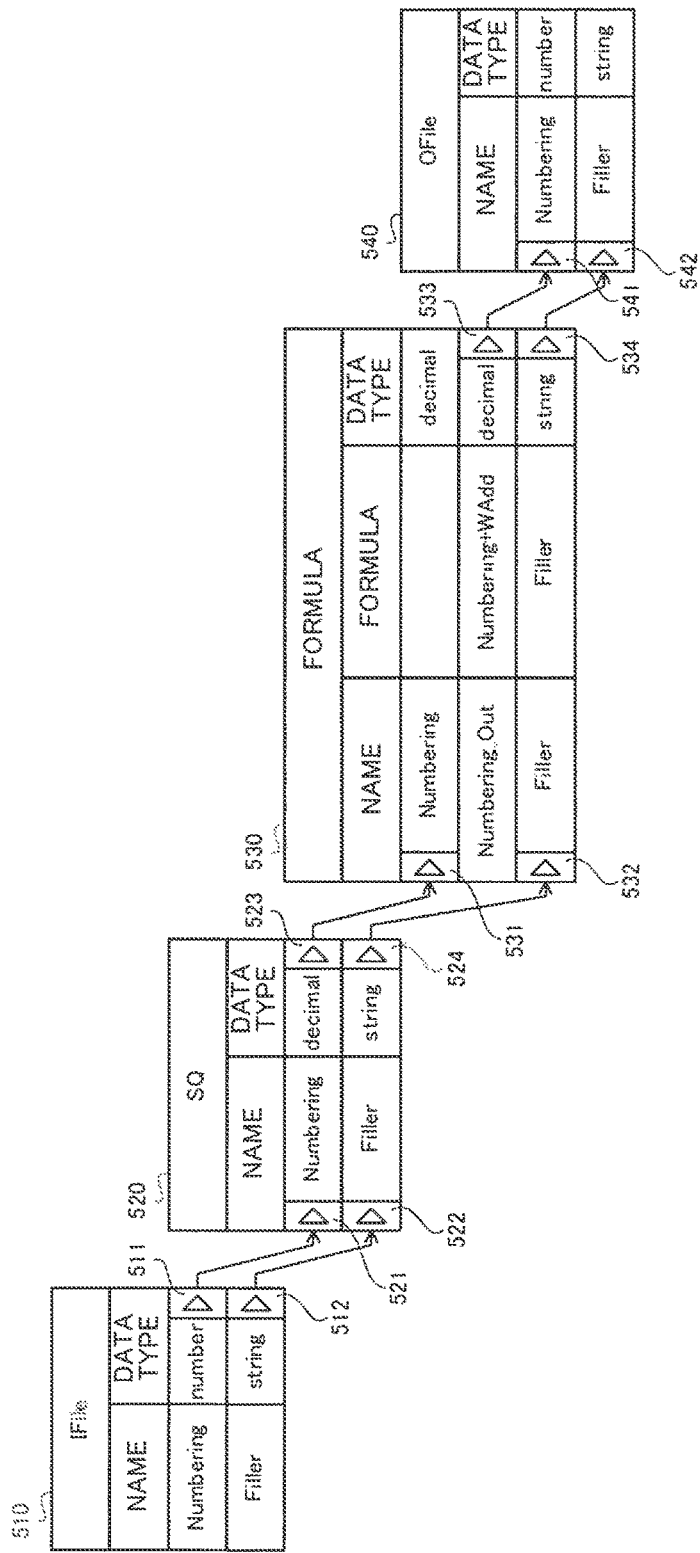
FIG. 6 is a table showing an example of a source code described in a programming language for an ETL tool.

Referring now to FIG. 6, the source code for PowerCenter generated from the source code of COBOL will be described. As shown in FIG. 6, the source code for PowerCenter is composed of one or more processing blocks connected to each other via the input port and the output port.

In the example shown in FIG. 6, the source code for PowerCenter includes a processing block 510, a processing block 520, a processing block 530, and a processing block 540.

The processing block 510 corresponds to the processing block 310, as well as to the instruction 210. The processing block 510 handles the data named Numbering and the data named Filler. The processing block 510 includes an output port 511 and an output port 512. The processing block 510 reads the data named Numbering and the data named Filler from the input file named I-File. The output port 511 outputs the data named Numbering. The output port 512 outputs the data named Filler.

The processing block 520 corresponds to the processing block 320, as well as to the instruction 220. The processing block 520 handles the data named Numbering and the data named Filler. The processing block 520 includes an input port 521, an input port 522, an output port 523, and an output port 524. The input port 521 receives the data named Numbering supplied from the output port 511. The input port 522 receives the data named Filler supplied from the output port 512. The output port 523 outputs the data named Numbering. The output port 524 outputs the data named Filler.

The processing block 530 corresponds to the processing block 330 and the processing block 340, as well as to the instruction 230 and the instruction 240. In other words, the processing block 530 is generated through integration of the processing block 330 and the processing block 340, for example by optimization. The processing block 530 handles the data named Numbering, the data named Numbering_Out, and the data named Filler. The processing block 530 includes an input port 531, an input port 532, an output port 533, and an output port 534. The input port 531 receives the data named Numbering supplied from the output port 523. The input port 532 receives the data named Filler supplied from the output port 524. The output port 533 outputs the data named Numbering_Out. The output port 534 outputs the data named Filler. Here, the data named Numbering_Out is acquired by adding data named Wadd to the data named Numbering.

The processing block 540 corresponds to the processing block 350, as well as to the instruction 250. The processing block 540 handles the data named Numbering and the data named Filler. The processing block 540 includes an input port 541 and an input port 542. The input port 541 receives the data named Numbering_Out supplied from the output port 533, as the data named Numbering. The input port 542 receives the data named Filler supplied from the output port 534. The processing block 540 writes the data named Numbering and the data named Filler, in an output file named O-File.

Figure 7:
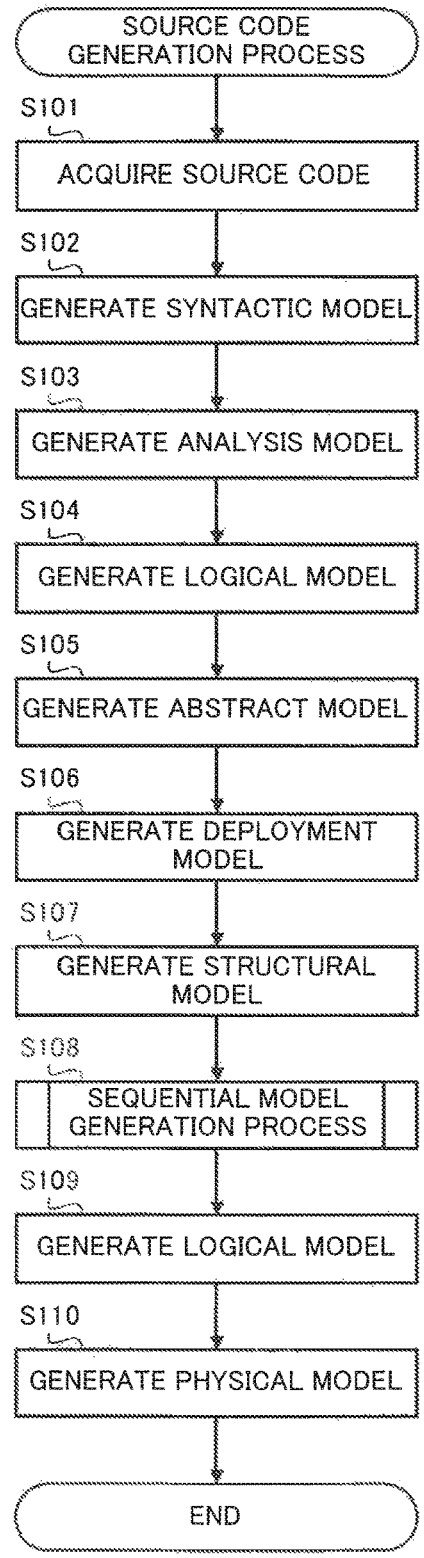
FIG. 7 is a flowchart showing a source code generation process performed by the source code generation device according to the exemplary embodiment.

Referring to FIG. 7, the source code generation process performed by the source code generation device 100 will be described. The CPU 101 starts the source code generation process upon detecting that a source code generation instruction has been inputted, for example by the user, through the keyboard 106.

First, the CPU 101 acquires the source code (step S101). For example, the CPU 101 reads the source code described in COBOL from the hard disk 104 onto the RAM 103.

Upon completing the step S101, the CPU 101 analyzes the syntax of the program described in the source code, to thereby generate a syntactic model (step S102). The syntactic model is a model representing the program described in the source code in a form of such as a syntax tree. The CPU 101 stores the generated syntactic model, for example in the hard disk 104.

Upon completing the step S102, the CPU 101 analyzes the generated syntactic model, to thereby generate an analysis model (step S103). The analysis model is a model in which item configuration and processing logic are structured. The CPU 101 stores the generated analysis model, for example in the hard disk 104.

Upon completing the step S103, the CPU 101 generates a logical model on the basis of the generated analysis model (step S104). The logical model is a model in which a role of an application program in the system is incorporated. The CPU 101 stores the generated logical model, for example in the hard disk 104.

Upon completing the step S104, the CPU 101 generates an abstract model on the basis of the generated logical model (step S105). The abstract model is a model in which the logical structure of the application program is abstracted. The CPU 101 stores the generated abstract model, for example in the hard disk 104.

Upon completing the step S105, the CPU 101 generates a deployment model on the basis of the generated abstract model (step S106). The deployment model is a model in which collective items and internal sub routines are deployed. The collective items include, for example, a structure variable. The CPU 101 stores the generated deployment model, for example in the hard disk 104.

Upon completing the step S106, the CPU 101 generates a structural model on the basis of the generated deployment model (step S107). The structural model is a model reorganized into an aggregate of processings with respect to one item of data. The CPU 101 stores the generated structural model, for example in the hard disk 104.

Figure 8:
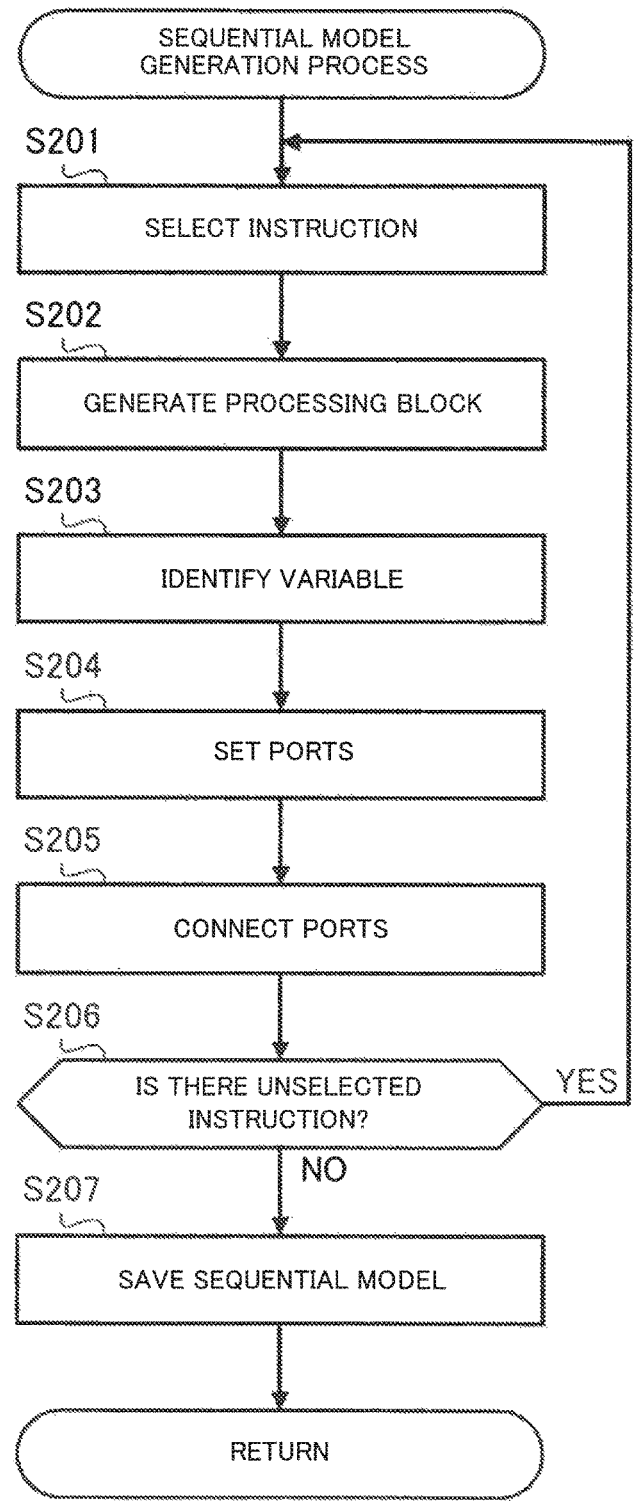
FIG. 8 is a flowchart showing the sequential model generation process shown in FIG. 7.

Upon completing the step S107, the CPU 101 executes a sequential model generation process on the basis of the generated structural model (step S108). The sequential model is a model in which, for example, the constituent elements of the program in COBOL are simply substituted with the constituent elements in the mapping of PowerCenter. The source code for PowerCenter shown in FIG. 5 is a sequential model. The sequential model generation process will now be described in detail, with reference to FIG. 8.

First, the CPU 101 selects the instructions from the source code described in COBOL (step S201). For example, the CPU 101 sequentially selects an instruction from the one described first in the source code (instruction described in an uppermost position). In the example shown in FIG. 5, the instructions are selected in the order of instruction 210, instruction 220, instruction 230, instruction 240, and instruction 250.

Upon completing the step S201, the CPU 101 generates a processing block associated with the selected instruction (step S202). For example, the CPU 101 references the processing block generation information stored in the hard disk 104, to thereby identify the processing block associated with the selected instruction. The CPU 101 then generates the identified processing block on the source code for PowerCenter. For example, the CPU 101 generates the processing block 330 on the basis of the instruction 230.

Upon completing the step S202, the CPU 101 identifies the variable handled by the selected instruction (step S203). For example, the CPU 101 identifies Rec-Number in INP-REC, Filler in INP-REC, Numbering in WorkRec, and Filler in WorkRec, as variables handled by the instruction 230.

Upon completing the step S203, the CPU 101 sets the port associated with the identified variable (step S204). For example, the CPU 101 sets the input port 331 for the processing block 330, as the input port associated with Rec-Number in INP-REC. Likewise, the CPU 101 sets the input port 332 for the processing block 330, as the input port associated with Filler in INP-REC. The CPU 101 sets the output port 333 for the processing block 330, as the output port associated with Numbering in WorkRec. Further, the CPU 101 sets the output port 334 for the processing block 330, as the output port associated with Filler in WorkRec.

Upon completing the step S204, the CPU 101 connects the ports set as above (step S205). For example, the CPU 101 connects the input port 331 set for the processing block 330 to the output port 323 corresponding to the input port 331, among the output ports provided for the processing block 320. Likewise, the CPU 101 connects the input port 332 set for the processing block 330 to the output port 324 corresponding to the input port 332, among the output ports provided for the processing block 320. Thus, the CPU 101 connects the input port of a given processing block to the output port corresponding to the input port, among the output ports provided for the processing block of the preceding stage.

In the case where the output port corresponding to the input port of a given processing block is not available in the processing block of the preceding stage, the CPU 101 adds the input port and the output port for transmitting the data, which should otherwise be transmitted through the first mentioned input port, to the processing block of a further preceding stage. The field is handled in the same way as the input port and the output port, in the aspects of the setting and the connection.

Here, it will be assumed, for example, that the variable named Filler in WorkRec is handled by the instruction 230 and the instruction 250, but not by the instruction 240. In this case, the output port 334 for transmitting the data to be stored in Filler in WorkRec is added to the processing block 330, when the processing block 330 associated with the instruction 230 is generated. However, when the processing block 340 associated with the instruction 240 is generated, the input port 342 and the output port 346 for transmitting the data to be stored in Filler in WorkRec are not added to the processing block 340. Accordingly, when the processing block 350 associated with the instruction 250 is generated, the field 352 for receiving the data to be stored in Filler in WorkRec is added to the processing block 350, and the input port 342 and the output port 346 are added to the processing block 340. Then the output port 334 and the input port 342 are connected to each other, the input port 342 and the output port 346 are connected to each other, and the output port 346 and the field 352 are connected to each other.

Upon completing the step S205, the CPU 101 decides whether there is an unselected instruction (step S206). For example, the CPU 101 decides that there is an unselected instruction when the instruction described at the end of the source code described in COBOL has not yet been selected. In contrast, when the instruction described at the end of the source code described in COBOL has already been selected, the CPU 101 decides that there is no unselected instruction. Upon deciding that there is an unselected instruction (YES at step S206), the CPU 101 returns to the step S201 and selects the next instruction. In the case where the CPU 101 decides that there is no unselected instruction (NO at step S206), the CPU 101 saves the sequential model (step S207).

More specifically, the CPU 101 stores the sequential model (file in which the sequential model is described) acquired through the process from the step S201 to the step S206, for example in the hard disk 104. The sequential model is, as shown in FIG. 5, composed of one or more processing blocks connected to each other via the input port and the output port. Upon completing the step S207, the CPU 101 finishes the sequential model generation process.

Upon completing the step S108 (sequential model generation process), the CPU 101 generates a logical model on the basis of the generated sequential model (step S109). The logical model is a model optimized from the sequential model into the source code (mapping) for PowerCenter. The CPU 101 stores the generated logical model, for example in the hard disk 104.

Upon completing the step S109, the CPU 101 generates a physical model on the basis of the generated logical model (step S110). The physical model is a model in which the logical structure expressed in the logical model is substituted with a physical structure. The CPU 101 stores the generated physical model, for example in the hard disk 104. The generated physical model is stored, for example, in a repository for PowerCenter. The source code for PowerCenter shown in FIG. 6 is a physical model.

Hereunder, a characteristic configuration of the exemplary embodiment of the present invention will be described.

FIG. 9 is a block diagram showing a characteristic configuration of the exemplary embodiment of the present invention. Referring to FIG. 9, the source code generation device 100 includes a source code acquisition unit 11, a processing block generation unit 12, a port setting unit 13, a port connection unit 14, and a source code generation unit 15.

The source code acquisition unit 11 acquires a source code described in a procedural programming language and in which a group of instructions that handles one or more variables is described. The processing block generation unit 12 generates a group of processing blocks associated with the group of instructions described in the source code acquired by the source code acquisition unit 11. The port setting unit 13 sets, in a group of processing blocks associated with a group of instructions executed between execution of an instruction that handles first a variable focused on among the one or more variables and execution of an instruction that handles last the variable focused on, among the group of processing blocks generated by the processing block generation unit 12, an input port and an output port for transmitting data referred to by the variable focused on. The port connection unit 14 connects the input port and the output port set by the port setting unit 13 in such a way that the data referred to by the variable focused on is transmitted. The source code generation unit 15 generates a source code described in a programming language for an ETL tool by executing, with respect to all of the one or more variables, the processing to be executed by the port setting unit 13 and the port connection unit 14 with respect to the variable focused on.

The exemplary embodiment of the present invention provides the following advantageous effects.

The arrangement according to this exemplary embodiment allows the source code described in the programming language for the ETL tool to be automatically generated on the basis of the source code described in the procedural programming language. Therefore, the user can acquire the source code for the ETL tool without the need to redesign the source code from the level of function designing.

Here, the user designs the system through a procedure-oriented approach, when constructing the system with the procedural programming language on the basis of the function designing. The procedure-oriented approach aims at, for example, structuring the repetitions of the process of handling input files, sorting out the detail of the process with respect to each record (item), and repeatedly outputting the processing result to output files. With the procedure-oriented approach, accordingly, the data processing is sequentially built up, taking into account the control structure.

In contrast, when constructing the system with the programming language for the ETL tool on the basis of the function designing, the user designs the system through a pipe-and-filter oriented approach. The pipe-and-filter oriented approach aims at, for example, definitizing only the record structure of input files, sorting out the data conversion process with respect to a unit record, and outputting the processing result to items of output files. Thus, with the pipe-and-filter oriented approach, the data conversion processes are accumulated to thereby build up the process for a unit record, without taking into account the control structure.

As described above, even when the same process is to be developed, the process needs to be developed in a largely different manner between the procedure-oriented approach and the pipe-and-filter oriented approach. Therefore, automatically generating the source code generated through the pipe-and-filter oriented approach on the basis of the source code generated through the procedure-oriented approach contributes to significantly reducing the cost required for the system development.

In addition, with this exemplary embodiment, the sequential conversion can be realized by association among each of the unit processes. More specifically, in this exemplary embodiment, generation of the processing block associated with the instruction, setting of the ports for transmitting the data to be handled in the processing block, and connection of the set ports are executed with respect to each instruction. Therefore, the source code can be converted through a simple process.

In many cases, the ETL tool is given a function to optimize the source code for the ETL generated by the user. Therefore, even when the source code generated through the sequential conversion based on association among each of the unit processes is not an optimized source code, in many cases the source code can be optimized by the function of the ETL tool.

With the procedure-oriented approach, the processing result is led out while the data stored in the variable is caused to vary by the instruction. With the pipe-and-filter oriented approach, in contrast, the processing result is led out while the data is transmitted between the processing blocks and caused to vary in the processing block. Therefore, through the data conversion process (source code generation process), "processing flow for editing data" is converted into "flow of data subjected to conversion". In this process, the "process" and the "conversion" are converted on a one-to-one basis so as to produce the same result in each individual case, and thus the identity of the processing can be secured.

In this exemplary embodiment, further, when the loop processing including inputting and outputting to the files is described in the source code described in the procedural programming language, a series of processings related to the loop processing, including the processings before and after the loop processing, are handled as processings related to the inputting and outputting to the files, in addition to the loop processing. Accordingly, for example, redundant instructions are excluded from the instructions of inputting and outputting to the files, so that the source code for the ETL tool is generated. Therefore, this exemplary embodiment allows the source code to be properly converted, despite the loop processing including the inputting and outputting to the files being described in the source code.

(Variation)

Although the present invention has been described with reference to the exemplary embodiment, various modifications and applications are possible when implementing the present invention.

With reference to the present invention, any part of the configurations, functions, and operations described in the foregoing exemplary embodiment may be adopted as desired. In the present invention, an additional configuration, function, or operation may be adopted apart from the foregoing configurations, functions, and operations. Further, the configurations, functions, and operations described in the foregoing exemplary embodiment may be combined as desired.

In the exemplary embodiment, the procedural programming language is exemplified by COBOL, and the ETL tool is exemplified by PowerCenter. However, it is a matter of course that the procedural programming language may be another one than COBOL, and the ETL tool may be another one than PowerCenter.

The source code generation device according to the present invention can be set up using an ordinary computer system, instead of a customized system. For example, the program for executing the foregoing operation may be recorded on a computer-readable recording medium such as a flexible disk, a CD-ROM (Compact Disk-Read Only Memory), a DVD (Digital Versatile Disk), and a MO (Magneto Optical disk), and distributed for installation in a computer system, so as to constitute the source code generation device executing the foregoing processes.

Further, the program may be stored in a disk device and the like of a server apparatus available on the Internet and, for example, downloaded to a computer by being superposed on the carrier wave.

The whole or part of the exemplary embodiments disclosed above can be described as, but not limited to, the following supplementary notes.

(Supplementary Note 1)

A source code generation device including:

a source code acquisition means for acquiring a source code described in a procedural programming language and in which a group of instructions that handles one or more variables is described;

a processing block generation means for generating a group of processing blocks associated with the group of instructions described in the source code acquired by the source code acquisition means;

a port setting means for setting, in a group of processing blocks associated with a group of instructions executed between execution of an instruction that handles first a variable focused on among the one or more variables and execution of an instruction that handles last the variable focused on, among the group of processing blocks generated by the processing block generation means, an input port and an output port for transmitting data referred to by the variable focused on;

a port connection means for connecting the input port and the output port set by the port setting means in such a way that the data referred to by the variable focused on is transmitted; and a source code generation means for generating a source code described in a programming language for an ETL tool by executing, with respect to all of the one or more variables, the processing to be executed by the port setting means and the port connection means with respect to the variable focused on.

(Supplementary Note 2)

The source code generation device according to supplementary note 1, further including an instruction selection means for selecting an instruction focused on according to an execution sequence of the group of instructions, among the group of instructions described in the source code acquired by the source code acquisition means, wherein the processing block generation means generates a processing block focused on associated with the instruction focused on, the port setting means regards, when the instruction focused on handles one of the one or more variables, the variable handled by the instruction focused on as being the variable focused on, and newly sets an unset input port and an unset output port, among the input ports and output ports for transmitting the data referred to by the variable focused on, in the group of processing blocks between the processing block associated with the instruction that handles first the variable focused on and the processing block focused on, the port connection means connects the input port and the output port newly set by the port setting means, in such a way that the data referred to by the variable focused on is transmitted among the group of processing blocks between the processing block associated with the instruction that handles first the variable focused on, and the processing block focused on, and the instruction selection means selects a next instruction according to the execution sequence of the group of instructions, after the processing block generation means, the port setting means, and the port connection means have completed the processing with respect to the instruction focused on.

(Supplementary Note 3)

The source code generation device according to supplementary note 2, wherein the processing block generation means generates, upon deciding that the instruction focused on is a part of a group of instructions related to a loop processing, a processing block associated with the instruction focused on, based on content of another group of instructions related to the loop processing.

(Supplementary Note 4)

A source code generation method including:

a source code acquisition step for acquiring a source code described in a procedural programming language and in which a group of instructions that handles one or more variables is described;

a processing block generation step for generating a group of processing blocks associated with the group of instructions described in the source code acquired by the source code acquisition step;

a port setting step for setting, in a group of processing blocks associated with a group of instructions executed between execution of an instruction that handles first a variable focused on among the one or more variables and execution of an instruction that handles last the variable focused on, among the group of processing blocks generated by the processing block generation step, an input port and an output port for transmitting data referred to by the variable focused on;

a port connection step for connecting the input port and the output port set by the port setting step in such a way that the data referred to by the variable focused on is transmitted; and a source code generation step for generating a source code described in a programming language for an ETL tool by executing, with respect to all of the one or more variables, the processing to be executed by the port setting step and the port connection step with respect to the variable focused on.

(Supplementary Note 5)

A computer readable storage medium recording thereon a program, causing a computer to function as:

a source code acquisition means for acquiring a source code described in a procedural programming language and in which a group of instructions that handles one or more variables is described;

a processing block generation means for generating a group of processing blocks associated with the group of instructions described in the source code acquired by the source code acquisition means;

a port setting means for setting, in a group of processing blocks associated with a group of instructions executed between execution of an instruction that handles first a variable focused on among the one or more variables and execution of an instruction that handles last the variable focused on, among the group of processing blocks generated by the processing block generation means, an input port and an output port for transmitting data referred to by the variable focused on;

a port connection means for connecting the input port and the output port set by the port setting means in such a way that the data referred to by the variable focused on is transmitted; and a source code generation means for generating a source code described in a programming language for an ETL tool by executing, with respect to all of the one or more variables, the processing to be executed by the port setting means and the port connection means with respect to the variable focused on.

In the present invention, the various exemplary embodiments and modifications may be made without departing from the broader spirit and scope of the present invention. The foregoing exemplary embodiments describe the present invention for explanatory purposes, and it is not intended to limit the scope of the present invention. Accordingly, the scope of the invention is illustrated by claims, not by the exemplary embodiments. The various modifications which are made within claims and within the scope of the significance of the invention equivalent to claims are regarded as being in the scope of the invention.

This application is based upon and claims the benefit of priority from Japanese patent application No. 2014-056686, filed on Mar. 19, 2014, the disclosure of which is incorporated herein in its entirety by reference.

INDUSTRIAL APPLICABILITY

The present invention is applicable to an ETL tool and similar tools.

REFERENCE SIGNS LIST

11 SOURCE CODE ACQUISITION UNIT
12 PROCESSING BLOCK GENERATION UNIT
13 PORT SETTING UNIT
14 PORT CONNECTION UNIT
15 SOURCE CODE GENERATION UNIT
16 INSTRUCTION SELECTION UNIT
20 STORAGE UNIT
100 SOURCE CODE GENERATION DEVICE
101 CPU
102 ROM
103 RAM
104 HARD DISK
105 RTC
106 KEYBOARD
107 MONITOR
108 NIC
210, 220, 230, 240, 250 INSTRUCTION
211, 221, 222, 231, 232, 241, 242, 243, 251, 252 REGISTER
244, 344 ADDER
260, 261, 262, 270, 271, 272 VARIABLE
280, 343 CONSTANT STORAGE UNIT
310, 320, 330, 340, 350, 510, 520, 530, 540 PROCESSING BLOCK
311, 312, 351, 352 FIELD
321, 322, 331, 332, 341, 342, 521, 522, 531, 532, 541, 542 INPUT PORT
323, 324, 333, 334, 345, 346, 511, 512, 523, 524, 533, 534 OUTPUT PORT
410, 420 FILE

What is claimed is:

1. A source code generation device comprising:
a memory storing instructions; and
one or more processors configured to execute the instructions to:
acquire a source code described in a procedural programming language and in which a first group of instructions that handles one or more variables is described;
generate a first group of processing blocks associated with the first group of instructions described in the source code;
generate a source code described in a programming language for an extract-transform-load (ETL) tool by setting, to each processing block in a second group of processing blocks associated with a second group of instructions executed between execution of an instruction that handles first a variable focused on among the one or more variables and execution of an instruction that handles last the variable focused on, in the first group of processing blocks, an input port and an output port for transmitting data referred to by the variable focused on;
connecting the input port of each processing block in the second group and the output port of another processing block in the second group in such a way that the data referred to by the variable focused on is transmitted;
select an instruction focused on according to an execution sequence of the second group of instructions, among the first group of instructions described in the source code;
generate a processing block within the first group focused on associated with the instruction focused on,
regard, when the instruction focused on handles one of the one or more variables, the variable handled by the instruction focused on as being the variable focused on, and newly set an unset input port and an unset output port, among the input ports and output ports for transmitting the data referred to by the variable focused on, to each processing block in the second group of processing blocks between the processing block in the first group associated with the instruction that handles first the variable focused on and the processing block in the first group focused on,
connect the newly set input port of a processing block of the first group and an output port of another processing block of the first group, and the newly set output port of the processing block of the first group and an input port of another processing block of the first group, in such a way that the data referred to by the variable focused on is transmitted among the first group of processing blocks between the processing block in the first group associated with the instruction that handles first the variable focused on, and the processing block in the first group focused on, and
select a next instruction according to the execution sequence of the second group of instructions, after newly setting an unset input port and an unset output port, and connecting the newly set input port and the newly set output port have been completed with respect to the instruction focused on.

2. The source code generation device according to claim 1,
the one or more processors further configured to execute the instructions to:
generate, upon deciding that the instruction focused on is a part of a third group of instructions related to a loop processing, a processing block associated with the instruction focused on, based on content of a fourth group of instructions related to the loop processing.

3. A source code generation method comprising:
acquiring a source code described in a procedural programming language and in which a first group of instructions that handles one or more variables is described;
generating a first group of processing blocks associated with the first group of instructions described in the source code;
generating a source code described in a programming language for an extract-transform-load (ETL) tool by setting, to each processing block in a second group of processing blocks associated with a second group of instructions executed between execution of an instruction that handles first a variable focused on among the one or more variables and execution of an instruction that handles last the variable focused on, in the first group of processing blocks, an input port and an output port for transmitting data referred to by the variable focused on;
connecting the input port of each processing block in the second group and the output port of another processing block in the second group in such a way that the data referred to by the variable focused on is transmitted;

selecting an instruction focused on according to an execution sequence of the second group of instructions, among the first group of instructions described in the source code;

generating a processing block within the first group focused on associated with the instruction focused on, regarding, when the instruction focused on handles one of the one or more variables, the variable handled by the instruction focused on as being the variable focused on, and newly set an unset input port and an unset output port, among the input ports and output ports for transmitting the data referred to by the variable focused on, to each processing block in the second group of processing blocks between the processing block in the first group associated with the instruction that handles first the variable focused on and the processing block in the first group focused on, connecting the newly set input port of a processing block of the first group and an output port of another processing block of the first group, and the newly set output port of the processing block of the first group and an input port of another processing block of the first group, in such a way that the data referred to by the variable focused on is transmitted among the first group of processing blocks between the processing block in the first group associated with the instruction that handles first the variable focused on, and the processing block in the first group focused on, and selecting a next instruction according to the execution sequence of the second group of instructions, after newly setting an unset input port and an unset output port, and connecting the newly set input port and the newly set output port have been completed with respect to the instruction focused on.

4. A non-transitory computer readable storage medium recording thereon a program, causing a computer to perform a method comprising:

acquiring a source code described in a procedural programming language and in which a first group of instructions that handles one or more variables is described;

generating a first group of processing blocks associated with the first group of instructions described in the source code;

generating a source code described in a programming language for an extract-transform-load (ETL) tool by setting, to each processing block in a second group of processing blocks associated with a second group of instructions executed between execution of an instruction that handles first a variable focused on among the one or more variables and execution of an instruction that handles last the variable focused on, in the first group of processing blocks, an input port and an output port for transmitting data referred to by the variable focused on;

connecting the input port of each processing block in the second group and the output port of another processing block in the second group in such a way that the data referred to by the variable focused on is transmitted;

selecting an instruction focused on according to an execution sequence of the second group of instructions, among the first group of instructions described in the source code;

generating a processing block within the first group focused on associated with the instruction focused on, regarding, when the instruction focused on handles one of the one or more variables, the variable handled by the instruction focused on as being the variable focused on, and newly set an unset input port and an unset output port, among the input ports and output ports for transmitting the data referred to by the variable focused on, to each processing block in the second group of processing blocks between the processing block in the first group associated with the instruction that handles first the variable focused on and the processing block in the first group focused on, connecting the newly set input port of a processing block of the first group and an output port of another processing block of the first group, and the newly set output port of the processing block of the first group and an input port of another processing block of the first group, in such a way that the data referred to by the variable focused on is transmitted among the first group of processing blocks between the processing block in the first group associated with the instruction that handles first the variable focused on, and the processing block in the first group focused on, and selecting a next instruction according to the execution sequence of the second group of instructions, after newly setting an unset input port and an unset output port, and connecting the newly set input port and the newly set output port have been completed with respect to the instruction focused on.

5. The source code generation device of claim 1, wherein a system is developed using the generated source code.

* * * * *